US008515160B1

(12) United States Patent
Khosla et al.

(10) Patent No.: US 8,515,160 B1
(45) Date of Patent: Aug. 20, 2013

(54) BIO-INSPIRED ACTIONABLE INTELLIGENCE METHOD AND SYSTEM

(75) Inventors: Deepak Khosla, Camarrillo, CA (US); Suhas E. Chelian, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 863 days.

(21) Appl. No.: 12/316,941

(22) Filed: Dec. 17, 2008

Related U.S. Application Data

(63) Continuation-in-part of application No. 11/973,161, filed on Oct. 4, 2007, now Pat. No. 8,165,407, and a continuation-in-part of application No. 12/214,259, filed on Jun. 16, 2008, now Pat. No. 8,363,939.

(51) Int. Cl.
*G06K 9/62* (2006.01)
*G06K 9/00* (2006.01)

(52) U.S. Cl.
USPC .......................... 382/156; 382/159; 382/181

(58) Field of Classification Search
None
See application file for complete search history.

(56) References Cited

U.S. PATENT DOCUMENTS

| | | | |
|---|---|---|---|
| 6,993,515 | B2 | 1/2006 | Chender et al. |
| 7,249,006 | B2 | 7/2007 | Lombardo et al. |
| 2003/0058340 | A1* | 3/2003 | Lin et al. ........................ 348/159 |
| 2006/0215025 | A1* | 9/2006 | Le Maigat et al. ............ 348/143 |
| 2007/0013372 | A1* | 1/2007 | Murray et al. ................. 324/244 |

OTHER PUBLICATIONS

Chen et al, "Process Monitoring Using a Distance-Based Adaptive Resonance Theory," 2002, Ind. Eng. Chem. Res. 41, pp. 2465-2479.*
Berg, A., "Shape matching and object recognition," UC Berkeley, PhD, 2005.
Bomberger, N., et al., "A new approach to higher-level information fusion using associative learning in semantic networks of spiking neurons," Information Fusion, 8 (3), 227-251, 2007.
Bradski, G., et al., "Store working memory networks for storage and recall of arbitrary temporal sequences," Biological Cybernetics, 71,469-480, 1994
Bradski, G., et al., "Fast learning VIEWNET architectures for recognizing 3-D objects from multiple 2-D views," Neural Networks, 8, 1053-1080, 1995.
Carpenter, G.A., "Default ARTMAP," International Joint Conference on Neural Networks, Portland, OR, 2003.
Carpenter, G.A., et al., "A massively parallel architecture for a self-organizing neural pattern recognition machine," Computer Vision, Graphics, and Image Processing, 37, 54-115, 1987.
Carpenter, G.A., et al., "The what-and-where filter: A spatial mapping neural network for object recognition and image understanding," Computer Vision and Image Understanding, 69, 1-22, 1998.
Carpenter, G.A., et al., "Self-organizing information fusion and hierarchical knowledge discovery: A new framework using ARTMAP neural networks," Neural Networks, 18, 287-295, 2005.

(Continued)

*Primary Examiner* — Bhavesh Mehta
*Assistant Examiner* — David F Dunphy
(74) *Attorney, Agent, or Firm* — Tope-McKay & Assoc.

(57) ABSTRACT

A bio-inspired actionable intelligence method and system is disclosed. The actionable intelligence method comprises recognizing entities in an imagery signal, detecting and classifying anomalous entities, and learning new hierarchal relationships between different classes of entities. A knowledge database is updated after each new learning experience to aid in future searches and classification. The method can accommodate incremental learning via Adaptive Resonance Theory (ART).

18 Claims, 9 Drawing Sheets

(56) References Cited

OTHER PUBLICATIONS

Fei-Fei, L., et al., "Learning generative visual models from few training examples: an incremental Bayesian approach tested on 101 object categories," Computer Vision and Pattern Recognition, 2004.

Khosla, D., et al., "A bio-inspired system for spatio-temporal recognition in static and video imagery," SPIE Defense and Security Symposium, Orlando, FL, 2007.

Khosla, D., et al., "Bio-inspired visual attention and object recognition," SPIE Defense and Security Symposium, Orlando, FL, 2007.

Markou, M., et al., "Novelty detection: a review—part 1: statistical approaches," Signal Processing, 83, 2481-2497, 2003.

Markou, M., et al., "Novelty detection: a review—part 2: neural network based approaches," Signal Processing, 83, 2499-2521, 2003.

Rao, R., "From unstructured data to actionable intelligence," IT Professional, 5(6), 29-35, 2003.

Rhodes, B., "Taxonomic knowledge structure and discovery from imagery-based data using the neural associative incremental learning (NAIL) algorithm," Information Fusion, 8(3), 295-315, 2007.

Rhodes, B., et al., "Maritime situation monitoring and awareness using learning mechanisms," Proceedings of IEEE Military Communications Conference, Atlantic City, NJ, 2005.

Russell, B., et al., "LabelMe: A database and web-based tool for image annotation," MIT AI Lab Memo AIM-2005-025, 2005.

Seibert, M., et al., "SeeCoast port surveillance," SPIE Photonics for Port and Harbor Security II, Orlando, FL, 2006.

Stauffer, C., "Perceptual Data Mining," Cambridge, MA, Massachusetts Institute of Technology, PhD, 2002.

\* cited by examiner

BIO-INSPIRED ACTIONABLE
INTELLIGENCE METHOD AND SYSTEM

RELATED APPLICATIONS

This application is a Continuation-in-Part application of U.S. patent application Ser. No. 11/973,161, filed Oct. 4, 2007 now U.S. Pat. No. 8,165,407, entitled "A BIO-INSPIRED VISUAL ATTENTION AND OBJECT RECOGNITION SYSTEM (VARS)" and this application is ALSO a Continuation-in-Part application of U.S. patent application Ser. No. 12/214,259, filed Jun. 16, 2008 now U.S. Pat. No. 8,363,939, entitled "VISUAL ATTENTION AND SEGMENTATION SYSTEM."

BACKGROUND OF THE INVENTION (1) Field of the Invention

The present invention relates to object detection in audio and visual imagery and, more specifically, to an actionable intelligence method and system which recognizes entities in an imagery signal, detects and classifies anomalous entities, and learns new hierarchal relationships between different classes of entities.

(2) Description of Related Art

Actionable intelligence is not new in the art. The term actionable intelligence denotes processing audio or video data and identifying entities that require action. Several actionable intelligence systems currently exist. One such system fuses video, radar, and other modalities to track and recognize anomalous vessel activities, however, this system lacks the ability to extract rules from the recognized vessel tracks, and is further limited to recognition of individual objects which renders it unsuitable for modeling group behaviors such as congregation/dispersion and leading/following. The system further fails to address different classes of abnormal behavior, such as fast versus slow approach. These limitations are addressed piecemeal by other systems. Other actionable intelligence systems are limited by requiring active search by system users, or focusing exclusively on specific tasks such as epidemiology (study of spreading diseases). Still other actionable intelligence systems are aimed at business or marketing decisions, where text or database information is considerably more structured and perhaps less dynamic than imagery and video data. There are also a number of other algorithms/modules which do not consider system integration at all, focusing exclusively on video surveillance, novelty detection, or rule extraction.

Thus, a continuing need exists for an actionable intelligence system which integrates the ability to (1) understand objects, patterns, events and behaviors in vision data; (2) translate this understanding into timely recognition of novel and anomalous entities and; (3) discover underlying hierarchical relationships between disparate labels entered by multiple users to provide a consistent and constantly evolving data representation.

(3) Other References Cited

[1] Bradski, G. A. Carpenter, and S. Grossberg, "STORE working memory networks for storage and recall of arbitrary temporal sequences,"*Biological Cybernetics.* 71, pp. 469-480, 1994;

[2] Carpenter, G. A. and S. Grossberg, "A massively parallel architecture for a self-organizing neural pattern recognition machine," *Computer Vision, Graphics, and Image Processing* 37: 54-115, 1987;

[3] Carpenter, G. A., Grossberg, S., and Rosen, D. B., "Fuzzy ART: Fast stable learning and categorization of analog patterns by an adaptive resonance system," *Neural Networks,* Vol. 4, pp. 759-771, 1991a;

[4] Carpenter, G. A., "Default ARTMAP," *International Joint Conference on Neural Networks,* Portland, Oreg. 2003;

[5] Carpenter, G. A., S. Martens, et al. (2005), "Self-organizing information fusion and hierarchical knowledge discovery: A new framework using ARTMAP neural networks," *Neural Networks* 18: 287-295, 2005;

[6] Khosla, D., C. Moore, et al. "A Bio-inspired System for Spatio-temporal Recognition in Static and Video Imagery," *Proc. of SPIE* Vol. 6560, 656002, 2007; and

[7] Russell, B. C., A. Torralba, et al. "LabelMe: a database and web-based tool for image annotation," *MIT AI Lab Memo* AIM-2005-025, 2005.

SUMMARY OF INVENTION

The present invention relates to object detection in audio and visual imagery and, more specifically, to an actionable intelligence method and system which recognizes entities in an imagery signal, detects and classifies anomalous entities, and learns new hierarchal relationships between different classes of entities.

A first aspect of the present invention is a method of actionable intelligence for detecting anomalous entities. The method comprises acts of initializing one or more processors to perform the following operations: First, an input signal is received, and a class of entities to be recognized is selected. Next, a set of entities of the selected class is recognized in the input signal. Then, a set of threshold criteria is selected, by which a set of anomalous entities can be detected within the set of recognized entities. The set of anomalous entities are detected by comparing the set of recognized entities against the set of threshold criteria. Finally, an operator is alerted to the presence of the set of anomalous entities, whereby the anomalous entities are detected.

In another aspect, the method further comprises an operation of prompting the operator to assign new labels to the set of anomalous entities. Next, underlying hierarchical relationships are discovered between the new labels assigned by the operator. Then, a knowledge database is updated with the new labels and hierarchical relationships, whereby anomalous entities are classified and hierarchically related.

In another aspect of the method of the present invention, the input signal is a signal selected from the group consisting of a video signal, an audio signal, a radar signal, and a sonar signal.

In yet another aspect of the method, in the operation of recognizing a set of entities, the entities recognized are selected from the group consisting of objects, spatial patterns, events and behaviors.

Another aspect of the present invention is an actionable-intelligence system for detecting anomalous entities, comprising one or more processors configured to perform the operations of the method of the present invention, as described above.

As can be appreciated by one skilled in the art, a further aspect of the present invention is an actionable intelligence computer program product for detecting anomalous entities. The computer program product comprises computer-readable instruction means stored on a computer-readable medium that are executable by a computer having a processor for causing the processor to perform operations of the method of the present invention, as described above.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to object detection in audio and visual imagery and, more specifically, to an actionable intelligence method and system which recognizes entities in an imagery signal, detects and classifies anomalous entities, and learns new hierarchal relationships between different classes of entities. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Further, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Introduction

The present invention relates to object detection in audio and visual imagery and, more specifically, to an actionable intelligence method and system which recognizes entities in an imagery signal, detects and classifies anomalous entities, and learns new hierarchal relationships between different classes of entities. For organizational purposes, the description of the present invention will be divided into the following sections: (2) Object, Pattern, Event and Behavior Recognition; (3) Novelty and Anomaly Detection; (4) Knowledge Extraction and Discovery; (5) Actionable Intelligence Data Processing System and; (6) Computer Program Product.

(2) Object, Pattern, Event and Behavior Recognition

Figure 1:
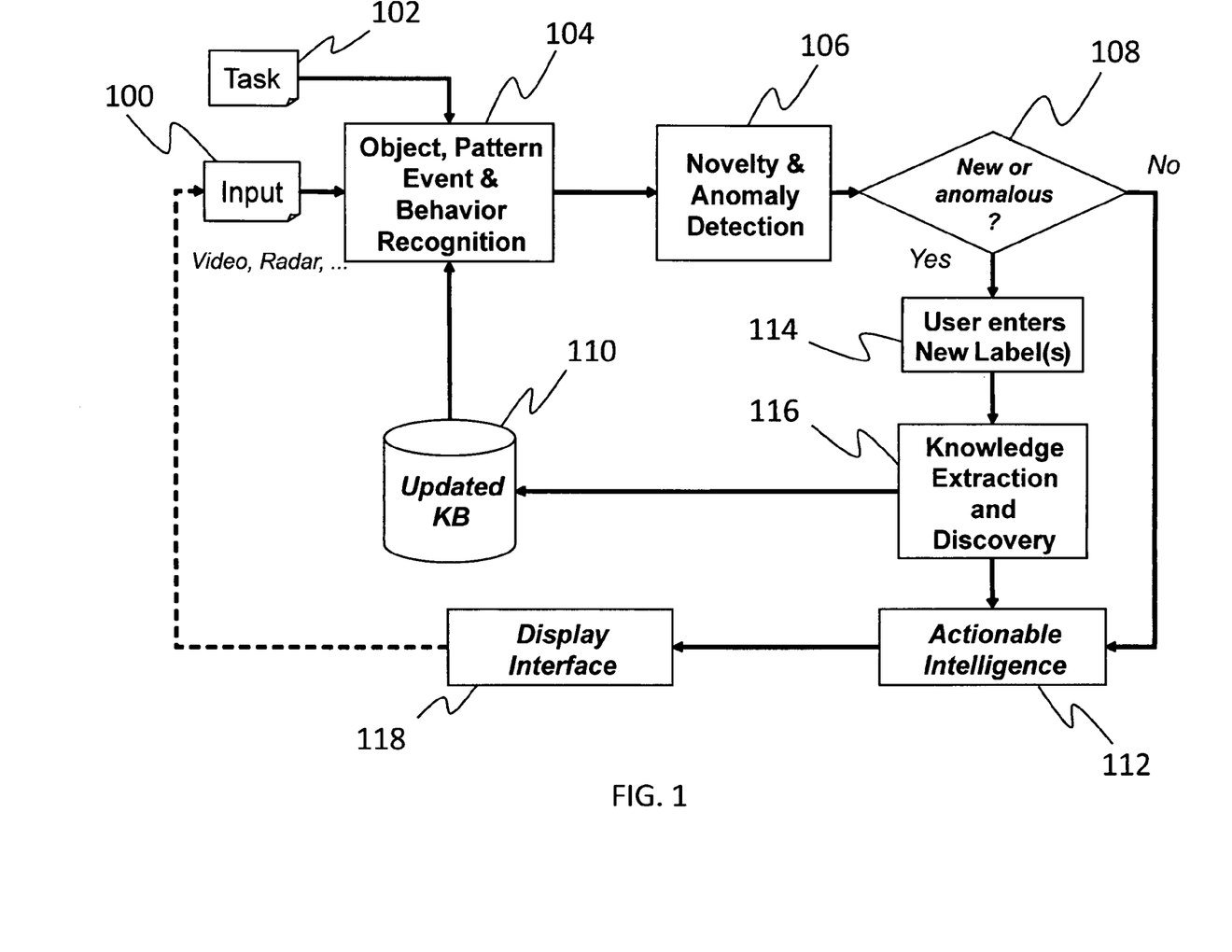
FIG. 1 is a flow diagram showing the overall method of the present invention.

The overall method of the present invention is illustrated in FIG. 1. The method begins with receipt of an input signal 100. The method of the present invention is compatible with a variety of input signals 100 including, but not limited to, visual signals, audio signals, radar, and sonar. The input signal may be received directly from a visual or audio imagery source such as a camera, microphone, sonar or radar detection device, or the signal may be received indirectly via a pre-recorded signal on a computer-readable medium such as a CD, DVD, floppy disc, or computer hard drive. An operator then inputs task information 102 including selecting a class of entities to be recognized in the input signal 100. Task information 102 can be entered prior to or after receipt of the input signal 100. An object, pattern, event and behavior recognition module 104 then recognizes the set of entities from the selected class in the input signal 100. The class of entities to be recognized can be objects, spatial patterns, or events and behaviors. Examples of detectable objects are humans, cars, buildings, trees, etc. Spatial pattern refers to arrangements of multiple objects in space, such as groups of humans, humans adjacent to automobiles, or arrangements of buildings along the side of a road. Furthermore, spatial patterns can be chained together over time to produce spatial-temporal patterns, referred to in this application as events and behaviors. Identifying events and behaviors from a discrete set of state transitions frees the system from requiring uninterrupted track data. In this manner, the method of the present invention can identify events and behaviors with any form of where-when input, including radar or intelligence (INT) data where individual tracks have been established and identified. The following section is a description of methods that can be used in module 102 for object recognition as well as spatial pattern (scene) & event recognition.

(2.1) Object-Recognition

Figure 2:
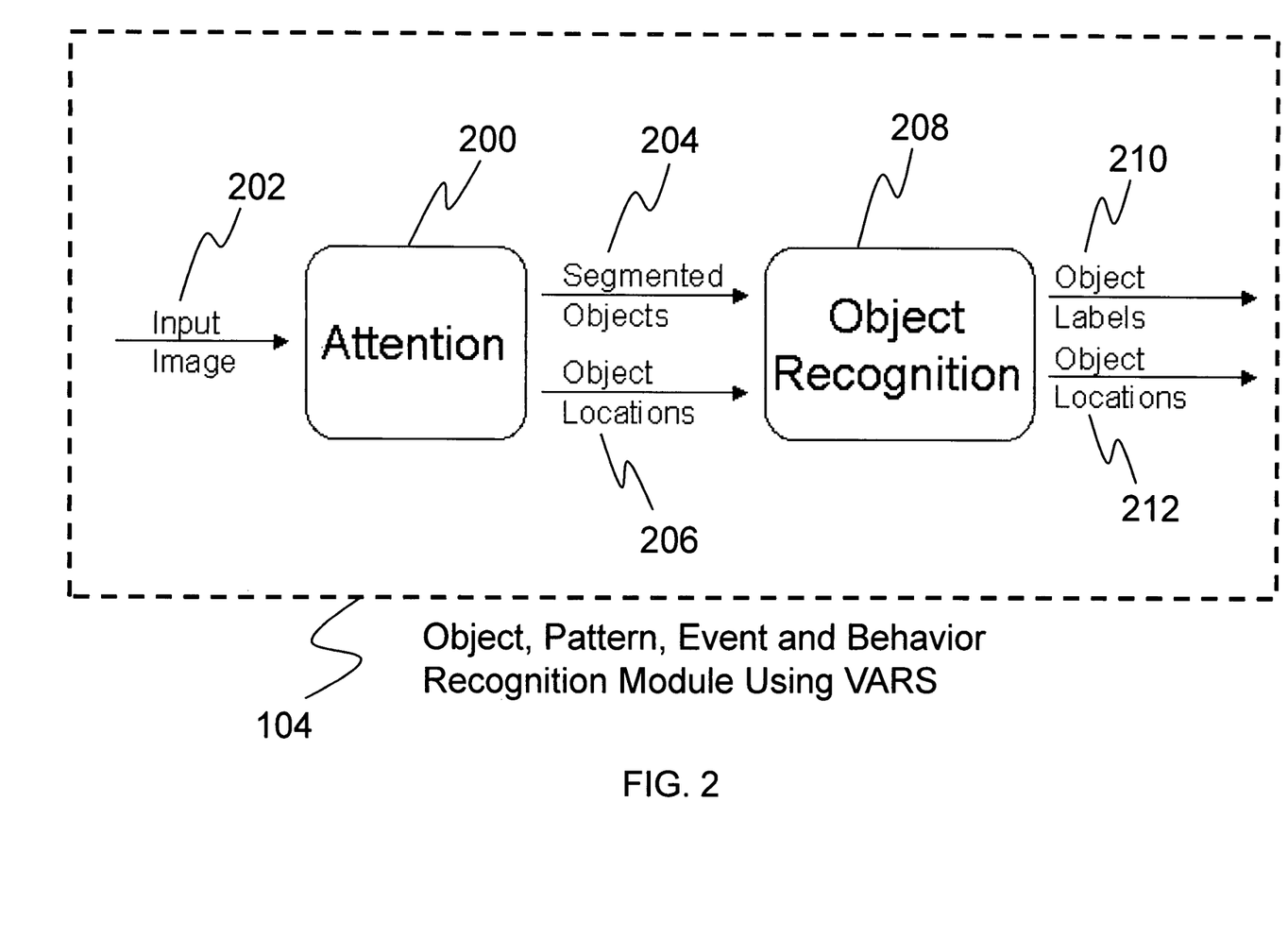
FIG. 2 is a block diagram showing an overview of the Visual Attention and object Recognition System (VARS) approach.

For object recognition, the recognition module 104 can comprise any of the various object detection classifiers known in the art capable of classifying the selected class. A non-limiting example of an object detection classifier that can be used in the recognition module 104 is disclosed in U.S. patent application Ser. No. 11/973,161, filed Oct. 4, 2007, entitled "A BIO-INSPIRED VISUAL ATTENTION AND OBJECT RECOGNITION SYSTEM (VARS)," incorporated by reference as though fully set forth herein. The application describes a bio-inspired Visual Attention and object Recognition System (VARS). The VARS approach locates and recognizes objects in a single framework. It is a modular framework for integrating attention, object recognition, and interactive learning. Its architecture is inspired by findings in neuroscience. FIG. 2 is a block diagram showing an overview of the VARS approach. It consists of two main modules, an attention module 200, and an object recognition module 208. The attention module 200 takes a color or grayscale image as input 202. It then finds and segments each object in the image. For each object found, the attention module 200 passes the segmented object 204 and its location 206 to the object recognition module 208. The object recognition module 208 will identify each object or, if the object is unknown, will request its label. The Object Recognition module 208 outputs object labels 210 and locations 212. VARS is inspired by findings in the primate visual system and functionally models many of its characteristic regions. Implementation of VARS with the present invention is computationally efficient and provides real-time object location and label data.

(2.2) Scene & Event Recognition

One approach for spatial pattern and event/behavior recognition (i.e., spatio-temporal recognition) that can be used in the recognition module 104 (in FIG. 1) is disclosed in [6], incorporated by reference as though fully set forth herein. This paper presents a bio-inspired method for spatio-temporal recognition in static and video imagery. It builds upon and extends previous work disclosed in U.S. patent application Ser. No. 11/973,161, filed Oct. 4, 2007, entitled "A BIO-INSPIRED VISUAL ATTENTION AND OBJECT RECOGNITION SYSTEM (VARS)." The VARS approach, as described in section (2.1) above, locates and recognizes objects in a single frame. Reference [6] presents two extensions of VARS. The first extension is a Scene Recognition Engine (SCE) that learns to recognize spatial relationships between objects that compose a particular scene category in static imagery. The SCE could be used for recognizing the category of a scene, for example, an office vs. a kitchen scene. The second extension is the Event Recognition Engine (ERE) that recognizes spatio-temporal sequences or events in sequences. The ERE extension uses a working memory model to recognize events and behaviors in video imagery by maintaining and recognizing ordered spatio-temporal sequences. The ERE is described further in section (2.2.2), below, and in FIG. 3. In one specific aspect of the ERE, both the working memory and classification modules are based on the use of Adaptive Resonance Theory (ART), which is in the public domain. ART neural networks provide online learning, search, and prediction. Conventional artificial intelligence (AI) and machine learning methods for pattern recognition such as Bayesian networks, fuzzy graph theory, etc. are mostly limited to spatial data. In addition, conventional AI usually cannot learn new patterns in real time. Neuro-inspired approaches have the unique potential to address these limitations. Although several variations of ART have been spawned over different design constraints and application domains, they share a central neural computation called the ART matching rule; see [2]. The ART matching rule clarifies the interaction between bottom-up inputs and top-down learned expectations. If these two representations resonate, old memories are changed minimally. However, a mismatch between the bottom-up and top-down representations triggers an arousal burst to create new memories. While the present invention works exceptionally well using ART-based modules, it can also employ other pattern recognition/learning methods such as, but not limited to, Support Vector Machine (SVM), or any other substantially robust pattern recognition module.

The working memory model is based on an ARTSTORE neural network that combines an ART-based neural network with a cascade of sustained temporal order recurrent (STORE) neural networks; see [1]. A series of Default ART-MAP classifiers ascribes event labels to these sequences; see [4]. Preliminary studies have shown that this extension is robust to variations in an object's motion profile. The performance of the SCE and ERE was evaluated on real datasets. The SCE module was tested on a visual scene classification task using the LabelMe dataset; see [7]. The ERE was tested on real world video footage of vehicles and pedestrians in a street scene. The system of the present invention is able to recognize the events in this footage involving vehicles and pedestrians.

(2.2.1) Scene Recognition

The output of VARS can be used by the Scene Classification Engine (SCE) for visual scene recognition. Scene classification goes beyond object recognition. It involves categorizing a scene as belonging to a particular class itself such as street, forest, or office settings. This approach could also be used to recognize important object configurations that the user would want to be notified about.

(2.2.1.1) Scene Schematization

The object label and location data provided by VARS can be analyzed with a schema encoding algorithm to create a graph that contains each object detected within a scene. The schema encoding algorithm allows representation of the relative locations of the objects in the schema with respect to each other, instead of the absolute locations.

In addition, when the system receives a new M-by-N input image (M pixels per row and N pixels per column), it creates a matrix of zeros of the same size, referred to as the matrix O. Using the classification and location data, pixels that correspond to each object's location get set to a unique integer Q within O. For example, all humans might get a value of 10, and hence all pixels that correspond to humans have their corresponding value within O set to 10. IF two objects occupy the same space, then the smaller of the two takes precedence. This process continues for all objects found in a scene. The result is an image with objects color coded according to class.

(2.2.1.2) Information Compression

Because O is likely to be very high dimensionally, it can be compressed to obtain O'. The level of compression is determined by a value c. O' is initialized to an M/c-by-N/c matrix. The compression factor c should be chosen to ensure O' is evenly divided. For example, a 1024-by-768 input image might use a c value of 128 resulting in an 8-by-6 O' matrix. Each region of O' represents a large $c^2$ portion of O. Within each $c^2$ sized cell of O, the total number of elements representing each object within the list of known objects L is counted. The cell with the most elements representing a particular object has the value of its corresponding O' cell set to the object's identifier Q and all of the object counts for that cell of O are set to zero. All of the other cells in O have their element counts for Q set to zero. This process continues until all cells have all of their element counts set to zero. This results in each cell of O' having only the label representing the object that dominates the corresponding region in O. However, some cells may be empty either because they do not contain any objects within L or because the objects within that cell are dominant in a separate O' cell. This encoding allows representation of each object only once.

(2.2.1.3) Classification

For each O' cell, a vector W with the same length as L is created, and all of its elements are set to zero, except for the one corresponding to that cell's Q value, which is set to 1. All of the W vectors are concatenated to form a feature vector that is input to a Default ARTMAP classifier, as disclosed in [4], incorporated by reference as though fully set forth herein. During training, Default ARTMAP learns the appropriate label for the scene and during testing it predicts the scene's class.

(2.2.1.4) Scene Classification Experiments

The recognition module's ability to recognize visual scene categories was tested in the LabelMe dataset; see [7]. This dataset contains many pictures of scenes that have been annotated by users. In initial tests, VARS was not used to find and label objects. Instead, LabelMe's annotation data was used, which defines the borders of the objects within an image and their labels. This dataset was searched for general scene categories, and an adequate number of images were found for four schemas. Wilderness, Office, Street, and Kitchen. O matrices were constructed using the annotation data to train and test the module. Of the 294 images harvested from LabelMe, one-third was used for training the recognition module and two-thirds were used for testing it. The module achieved 97 percent accuracy overall. Individual class results are reported in Table 1, below.

TABLE 1

Experimental results of scene classification using LabelMe dataset.

| Secene Type | Accuracy |
| --- | --- |
| Street Scene | 96% |
| Office Scene | 98% |
| Wilderness Scene | 95% |
| Kitchen Scene | 100% |
| Overall | 97% |

(2.2.2) Event Recognition Engine (ERE)

Figure 3:
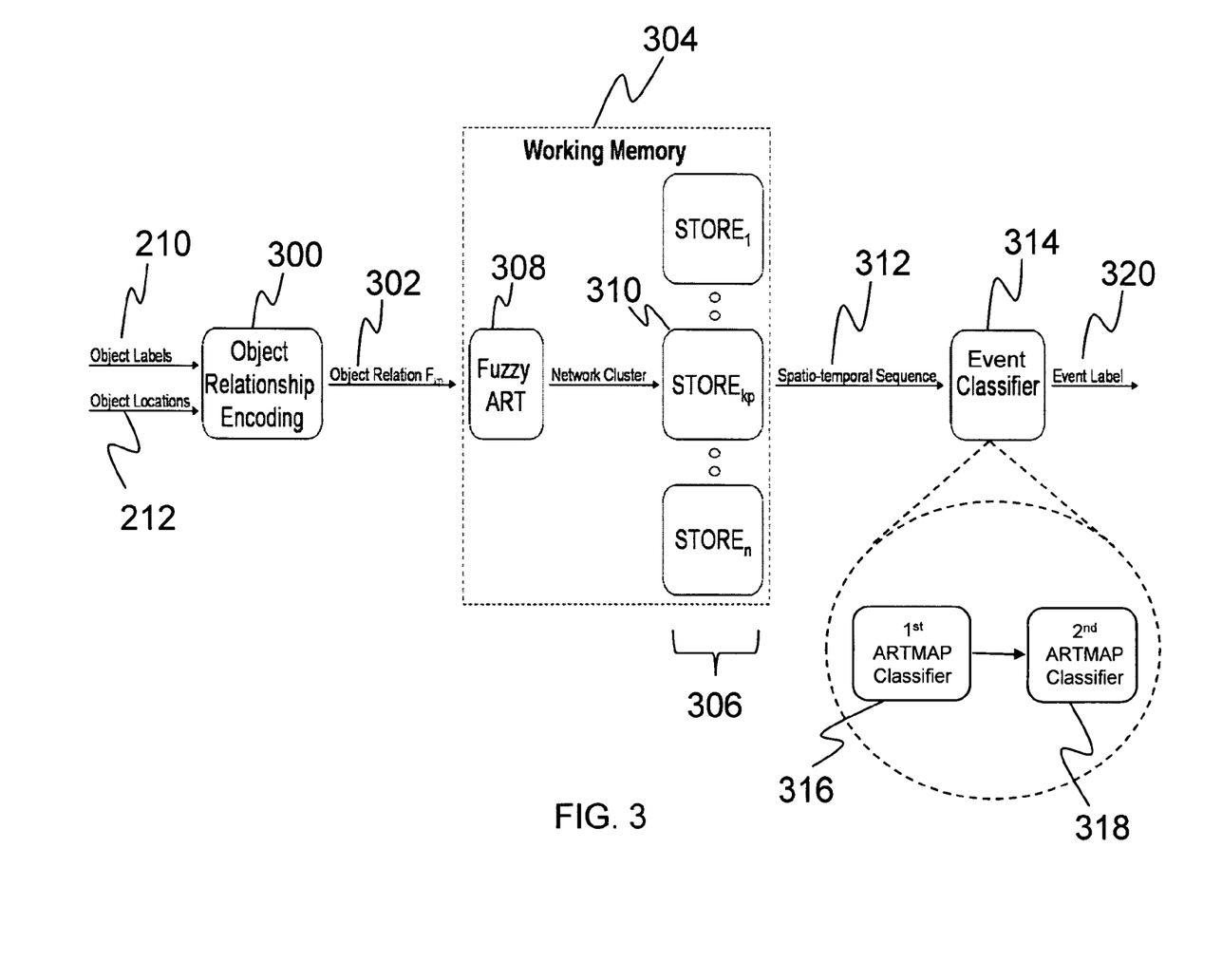
FIG. 3 is a schematic diagram showing the primary modules of the recognition engine of the present invention.

The Event Recognition Engine (ERE) enables VARS' to perform spatio-temporal relationship recognition. This module combines both a biologically inspired working memory model and an ARTMAP based classifier. It is encapsulated and can be easily integrated into any system that provides appropriate input. FIG. 3 is a schematic diagram showing the primary modules of the event recognition engine 208 (in FIG. 2), as further detailed below.

(2.2.2.1) Module Input

The spatio-temporal relationship recognition module expects as input a list of sectors L, which consist of all recognized objects labels 210 and locations 212 in a frame. Each vector has a unique identifier (e.g. Bob), a class (e.g. pedestrian), and position attributes (e.g. the object's centroid position). This is represented as two integers for the unique identifier and class, and two floating point values for the Cartesian position attributes that represent the object's centroid position.

(2.2.2.2) Object Relationship Encoding 300 (in FIG. 3)

For each object k and p in L, an object relation vector $F_{kp}$ 302 is generated that represents the spatial relationship between k and p. This is done for all of the objects in L, including the self referential relationship $F_{kk}$. $F_{kp}$ contains information with regard to the labels of objects k and p, and the relative spatial relationship between objects k and p. $F_{kp}$ also contains information starting whether the objects exist in the current frame. Object relation vector $F_{kp}$ 302 is represented using eleven floating point values, which are all initialized to zero. The first eight point values are binary values that are given a value of 1, if they satisfy certain constraints. If the relationship between k and p exists in the current frame then the first value is changed to 1. If the relationship between k and p existed in the previous frame then the second value is changed to 1. The third value is set to 1 if k is a person. The fourth value is set to 1 if k is a vehicle. The fifth value is set to 1 if k is some other category. The sixth value is set to 1 if p is a person. The seventh value is set to 1 if p is a vehicle. The eighth value is set to 1 if p is some other category. The ninth and tenth values encode the relative distances between k and p on the X and Y axes. The tenth value encodes the Euclidian distance of object k and p.

(2.2.2.3) Working Memory 304 (in FIG. 3)

A method of retaining information about the past is crucial to event recognition. A robust working memory 304 permits the detection of the temporal sequences which form an event. Our working memory module is based on an ARTSTORE neural network; see [1]. This architecture combines an ART-based neural network and a sustained temporal order recurrent (STORE) neural network. The combined ARTSTORE architecture is capable of selectively attending to and learning stored sequences of past events or actions.

ART networks are fast, on-line networks capable of clustering spatial or spatio-temporal patterns. Their stored memories remain stable in the face of new input, while remaining plastic to these new inputs. ART can be operated in supervised or unsupervised modes. STORE networks are also fast, on-line networks capable of encoding the temporal order of sequential events. A STORE neural network is a working memory model that encodes an invariant temporal order of sequential events. STORE neural networks are biologically inspired and are able to reproduce psychological data on human working memories. As new items are presented to a STORE model it is able to preserve the order of previous items. In other words, their storage performance is invariant to the particular order of events even with repetitions. The parameters of the STORE network can be adjusted so that it forgets information in the distant past, while preserving information about recent sequences. STORE networks can be created on the fly, one for each object relationship, and are used to track the binary relationships between objects.

At a time t, STORE 306 accepts a single integer value as input. To accomplish this, a Fuzzy ART neural network 308 is used as a preprocessor for each $F_{kp}$ vector 302. Fuzzy ART is an unsupervised learning model; see [3]. A Fuzzy ART neural network consists of two layers of neurons, the first is used to compare the input to previously stored patterns, and the second clusters the input into discrete chunks. The vigilance parameter dictates how general or fine-grained the patterns stored in the system will be. A high vigilance means that the system will probably contain many more patterns. Complement coding is used on all input vectors, in order to prevent unnecessary category proliferation. A winner-take-all rule is used on the ART output neurons, so that only a single output unit is active for any given input pattern. Thus, the ART network collapses the dimensionality of the input to a single integer value representing the active node. The index of the winning node is stored as a variable s.

Once s is calculated for a given $F_{kp}$ vector, the current bank of STORE 306 short term memories is then searched. Each bank corresponds to the history of object relationships between two objects, so each member of the bank has an identifier corresponding to an object and the object it is relating to. If a $STORE_{kp}$ 310 short term memory is found that corresponds to the history of relations between k and p, then s is sent as input into that network. If a STORE network is not found, then a network is initialized with an input of 0 followed by s. Also, if any STORE network does not have an $F_{kp}$ vector as input in the current frame, it receives an input of 0. After a sufficient number of zero inputs, a STORE network is unloaded.

(2.2.2.4) Classifier

The spatio-temporal sequence output 312 of each STORE network is then normalized and used as input into an event classifier framework 314 comprising two Default ARTMAP classifiers 316 and 318, which assign a label 320 to the event. In the event classifier 314, it is important to have a label that characterizes a relationship as insignificant, which is the class that most object relationships probably fall into.

The event recognition system can be trained with labeled data. The first Default ARTMAP classifier 316 detects events and the second Default ARTMAP classifier 318 classifies detected events. It was found that a single classifier does not perform nearly as well as this cascaded approach. Both classifiers have the same input, but if no event is detected by the first ARTMAP classifier then the output of the second is not calculated.

(2.2.2.5) Event Recognition Experiments

The system of the present invention was tested preliminarily on video footage of vehicles and pedestrians. The footage included many events in which cars leave the scene, people leave the scene, people enter cars, people exit cars, and people loitered individually or in groups. There are often more than ten objects in a particular frame. For these experiments four static objects representing the sides of the image were used. 33.5 minutes of this footage at 5 frames per second was processed. Half of the footage was used for training and the remaining half was used for testing. The event detection classifier achieved a false alarm rate of 0.4 percent, meaning it almost always was able to determine if an event was occurring or not. The system was also able to detect 52.2 percent of the events that occurred. Of those 52.2 percent, all were classified correctly by the event classifier. The event recognition engine proved very robust to variations in an object's motion profile. It should be noted that these results are preliminary and should not be construed as limitations to the capabilities of the present invention.

(3) Novelty and Anomaly Detection

Now referring back to FIG. 1, the task information 102 entered by the operator includes a set of threshold criteria by which a set of anomalous entities can be detected within the set of recognized entities. The threshold critera can either be entered by an operator, or be extracted from a domain knowledge database 110 or training set. A novelty and anomaly detection module 106 analyzes each of the set of recognized entities against the threshold criterion and identifies those entities that are new or anomalous 108. There are a number of ways to determine the novelty of recognized entity. A simple method would be to alert users when a new node is created in the second ARTMAP classifier 318 (in FIG. 3), indicating a new event model (e.g. person entering from the left whereas only people entering from the right were seen before). The creation of new nodes is partly controlled by the ART vigilance parameter previously described. Another way to determine novelty is to use the output of the second ARTMAP classifier 318. The second ARTMAP classifier 318 will produce a distributed prediction output for each event type. When normalized, these outputs can be interpreted as a probability of detection across event types. Non-limiting examples of distributed prediction outputs produced by the second ARTMAP classifier are: 0.5 "Person entry", 0.2 "Person exit", 0.15 "Vehicle entry", and 0.15 "Vehicle exit." One might look at the absolute value of the highest prediction (e.g. 0.5>0.49) while another method may compare that value to the next highest (e.g. 0.5−0.2>0.29). The computational framework for anomaly detection envisioned by the inventors was based on normalcy modeling, but other frameworks for anomaly detection are also supported by the method of the present invention.

Figure 4A:
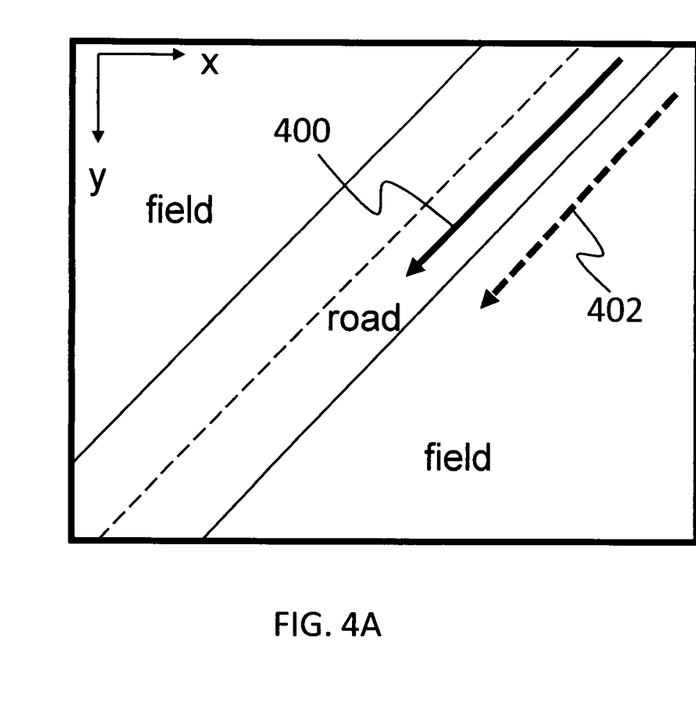
FIG. 4A is an illustration showing the trajectories of two objects entering a scene.
Figure 4B:
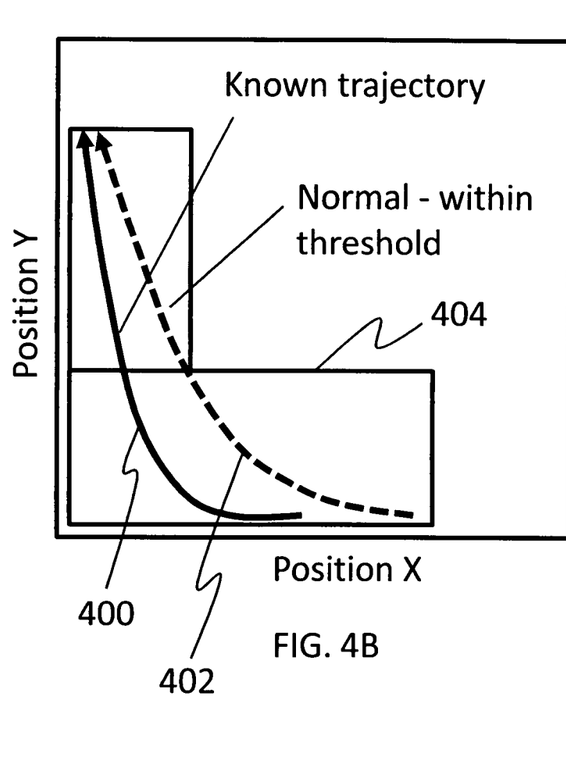
FIG. 4B is a position versus velocity graph showing a comparison between a known normal trajectory and a trajectory within the normalcy threshold.

The input to the novelty and anomaly detection module 106 can be a multi-modal vector representing entities such as objects, patterns, events and behaviors from the recognition module 104. The input can include traffic flow, weather, and transactional data presented across time. Multiple source information can allow this module to condition its hypotheses on situational influences. For example, a person's course change may not be alarming given obstructions. Similarly, a vehicle's presence in a restricted area may be an alarming event, but that behavior may also be consistent with mechanical failure. The solid track 400 in FIGS. 4A and 4B represents a scene entry which has been learned as an acceptable trajectory from user input, domain knowledge, or a small training set. The dotted track 402 represents a similar scene entry with a more southerly (positive y direction) approach. The dotted track 402 is compared with the solid track 400 and, depending on whether the dotted track 402 exceeds the selected threshold criterion 404, will be clustered as either "normal" or "new/anomalous" 108 (in FIG 1). In the example in FIG. 4B, the dotted trajectory 402 lies within the selected threshold 404, and is therefore labeled "normal" and appropriate actionable intelligence 112 (FIG. 1), such as a non-emergency alert signal, is sent to an operator. The Object-Relation-Encoding module 300 (in FIG. 3) clusters over relative position and class. The Working Memory module 304 encodes the state transition from outside to inside the scene, and the final classifier module 314 labels this sequence as normal.

Figure 5A:
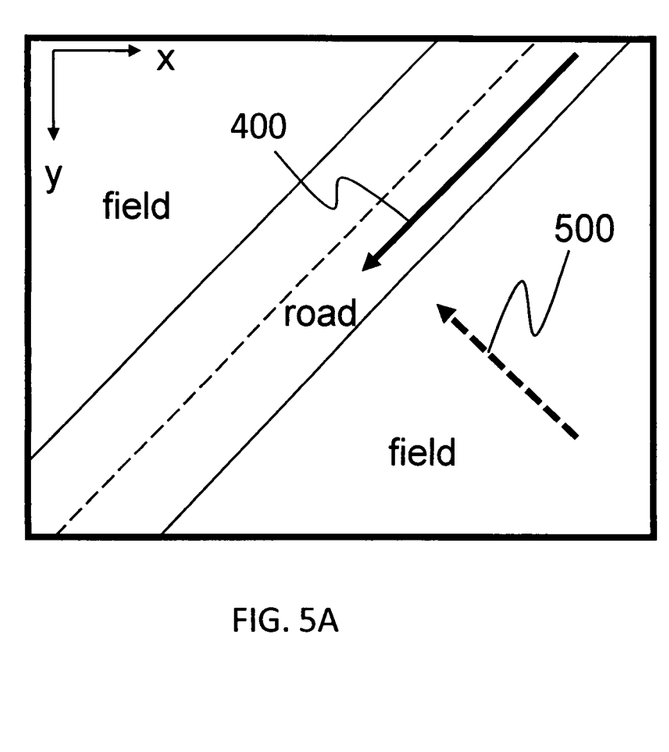
FIG. 5A is an illustration showing the trajectories of two objects entering a scene.
Figure 5B:
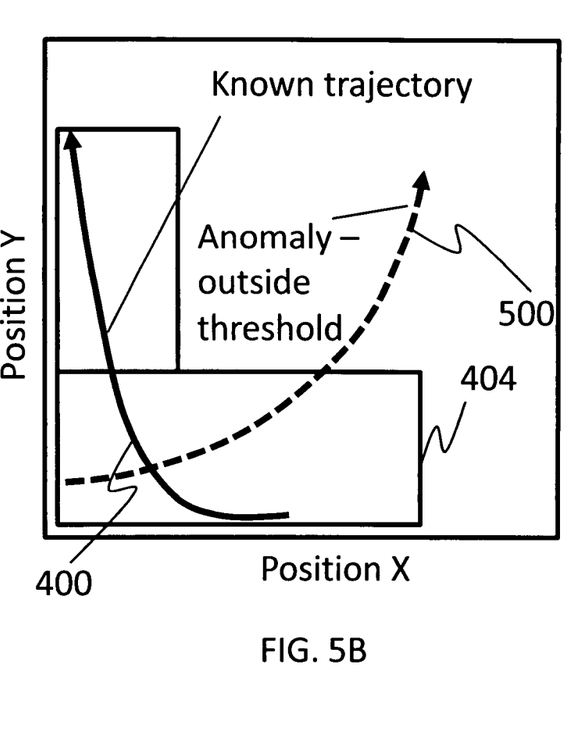
FIG. 5B is a position versus velocity graph showing a comparison between a known normal trajectory and a trajectory which exceeds the selected normalcy threshold.

Now consider the dotted track 500 in FIGS. 5A and 5B. In this scenario, the dotted trajectory 500 exceeds the selected threshold criterion 404. At this point, the operator is alerted and prompted to inspect the track and enter new labels 114 (in FIG. 1) for the track. The operator may enter a label indicating trespassing or the operator may overrule the warning, noting that the incoming person is simply using a different approach vector.

(4) Knowledge Extraction and Discovery

Figure 6A:
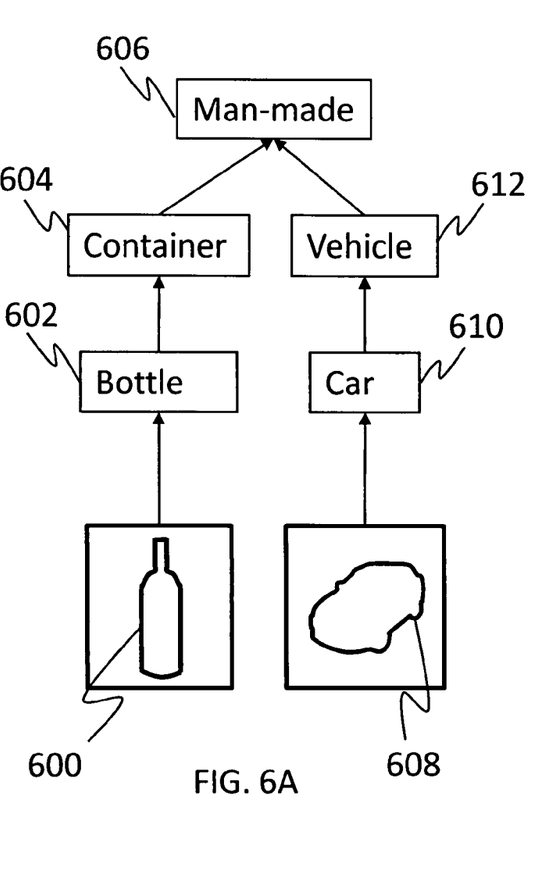
FIG. 6A is a diagram showing an example of object level labeling of manmade objects.
Figure 6B:
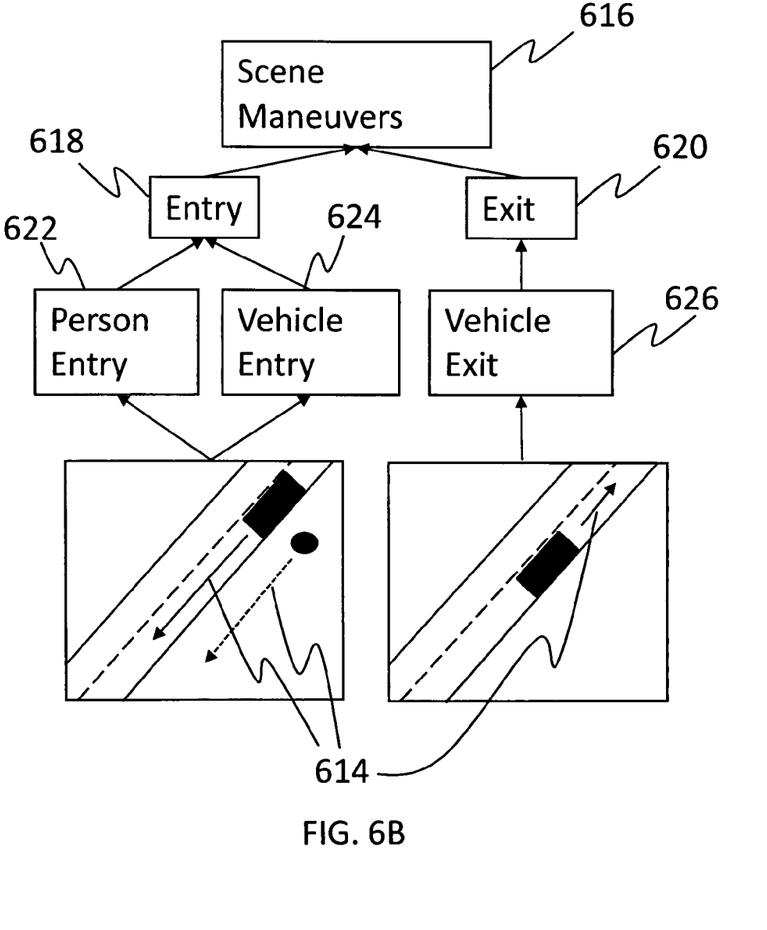
FIG. 6B is a diagram showing an example of object level labeling of people and vehicles entering and exiting a scene.

Once a new or anomalous entity has been detected, the operator is alerted and can be prompted to enter more information 114 (in FIG. 1). The novel or anomalous entity can be due to new objects, or new spatial relationships and/or temporal sequences. The knowledge extraction and discovery module 116 then uses the labels entered by the operator to discover underlying hierarchy and relationships to provide a consistent data representation in forms that are understandable and confirmable by humans. The new data is then used to update a knowledge database 110, which is used in turn for the next object detection task 102 and 104. An example of object level labeling is shown in FIGS. 6A and 6B. Referring to FIG. 6A, a wine bottle 600 can be labeled as a bottle 602, a container 604, or a man-made object 606. Similarly, a car 608 can be labeled as a car 610, a vehicle 612, or a man-made object 606. FIG. 6B shows different trajectories 614 for people and vehicles entering and exiting a scene. All trajectories 614 shown are examples of scene maneuvers 616, which can be specified as entry 618 or exit 620, and further specified as person entry 622, vehicle entry 624, vehicle exit 626, etc. These differing labels could come from operators or experts of different goals or backgrounds, and all of these labels are accurate yet inconsistent. Given the previous example, a rule discovery process could produce the hierarchical relationship shown in FIGS. 6A and 6B without ever receiving explicit instruction as to the rules underlying these relationships. In addition, confidence and equivalence measures can be made on each link. New work has used the ability of ARTMAP (Adaptive Resonance Theory Mapping) to produce one-to-many predictions to derive categorical relations from inconsistent yet accurate labels; see [5].

Figure 7:
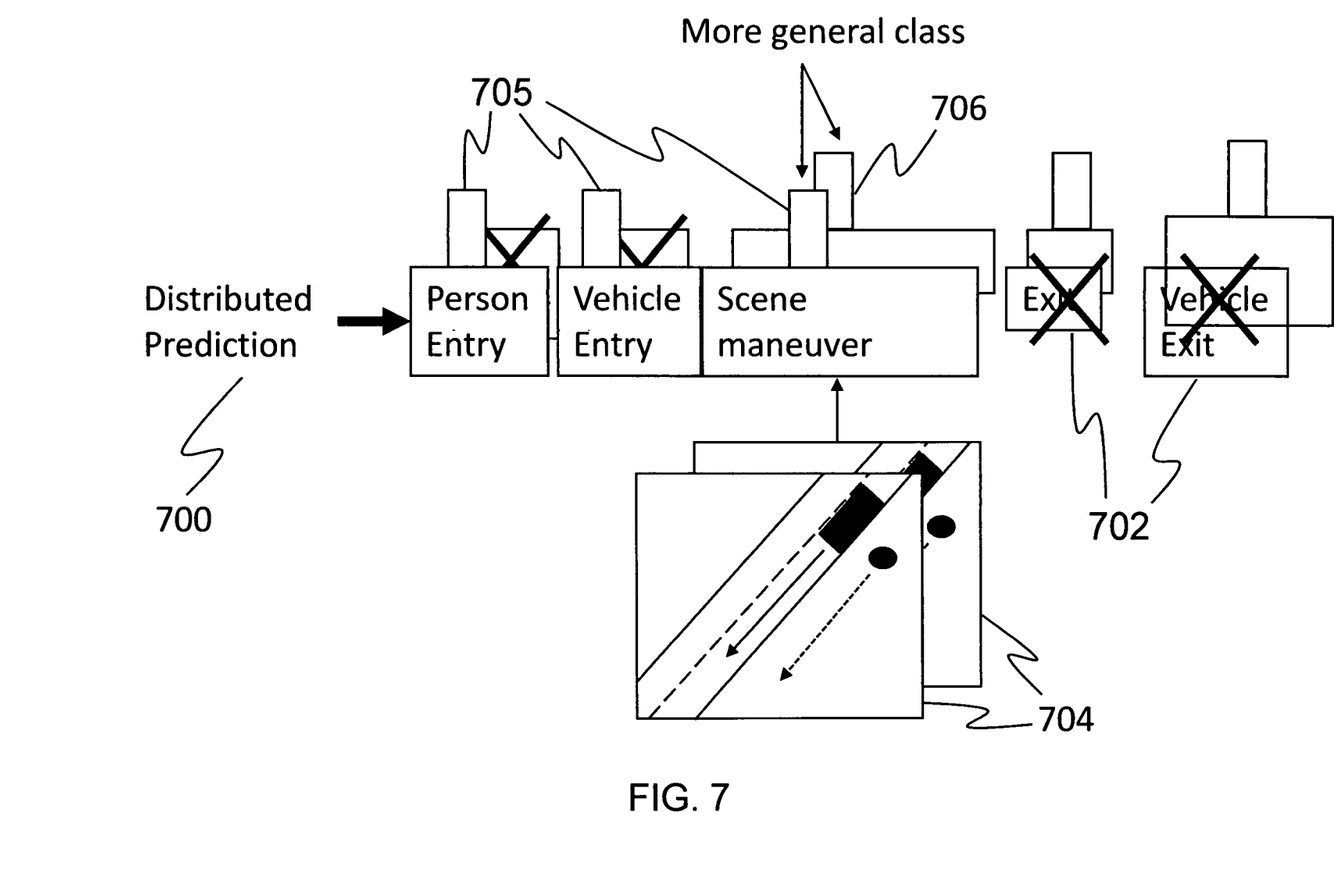
FIG. 7 is a diagram showing the object level labeling process of the present invention.

An example of the object level labeling process of the present invention is shown in FIG. 7. The labeling process begins with a distributed prediction for each input 700. Class labels with low activation are removed 702 and this process is iterated across several inputs 704. Overlapping class labels 705 produce a hierarchy with more frequently predicted class labels placed at the upper layers of the hierarchy 706. Thus the knowledge extraction and discovery module 116 (in FIG. 1) can integrate knowledge from multiple experts without requiring expensive knowledge engineering. This information can be used to update the knowledge database 110 for display 118 as well as future actionable intelligence 112.

(5) Actionable Intelligence Data Processing System

Figure 8:
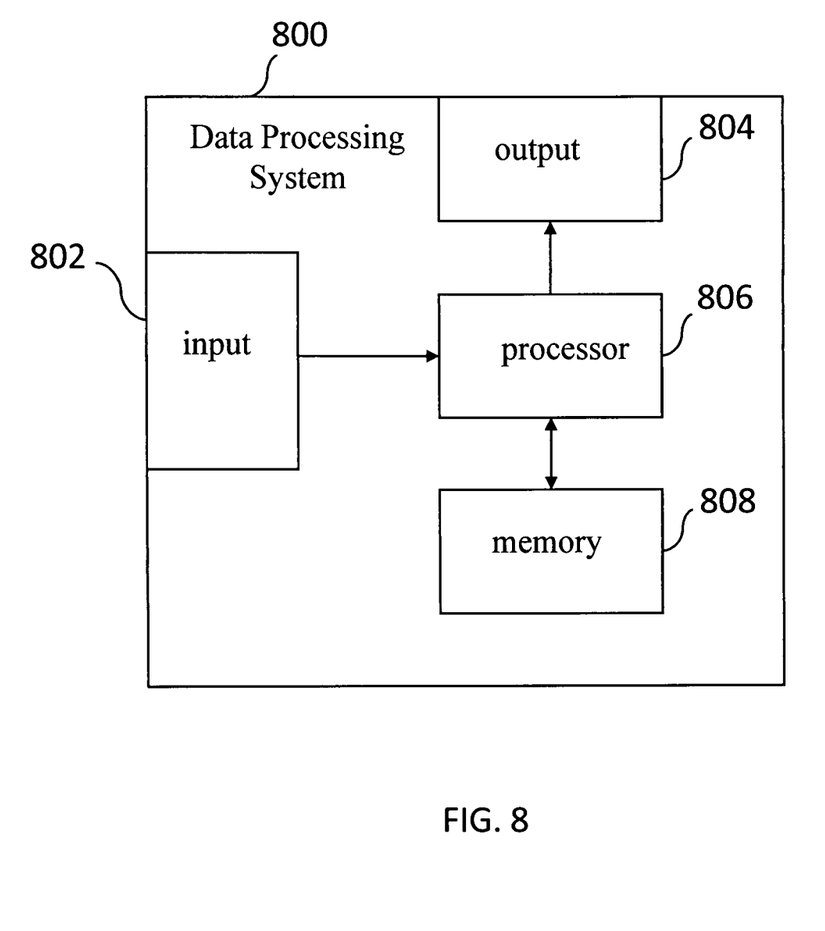
FIG. 8 is a block diagram showing a generic data processing system for use with the present invention.

A block diagram depicting the components of a generic active intelligence data processing system of the present invention is provided in FIG. 8. The data processing system 800 comprises an input 802 for receiving information from at least one input data source or from an operator. Note that the input 802 may include multiple "ports." Typically, input is received from at least one imaging device, non-limiting examples of which include video images, audio signals, radar and sonar. An output 804 is connected with the processor for providing information regarding the presence and/or identity of object(s) in the input signal to an operator, or to update the knowledge database. Output may also be provided to other devices or other programs; e.g., to other software modules, for use therein. The input 802 and the output 804 are both coupled with a processor 806, the processor containing appropriate architecture to perform the acts of the method of the present invention, including, but not limited to object, pattern, and behavior recognition, novelty and anomaly detection, and knowledge extraction and discovery. The processor 806 is coupled with a memory 808 to permit storage of data such as image memory strings and software that are to be manipulated by commands to the processor 806.

(6) Computer Program Product

Figure 9:
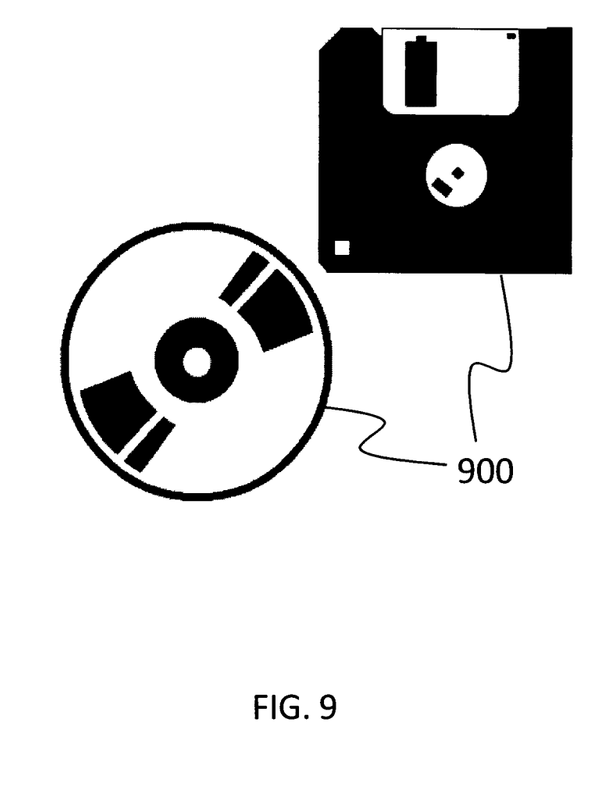
FIG. 9 is an illustration of a computer program product according to the present invention.

An illustrative diagram of a computer program product according to the present invention is depicted in FIG. 9. The computer program product 900 is depicted as an optical disk such as a CD or DVD, but the computer program product generally represents any platform containing computer-readable instruction means stored on a computer-readable medium that are executable by a computer having a processor for causing the processor to perform the operations of the method of the present invention, as previously described.

What is claimed is:

1. A method of actionable intelligence for detecting anomalous entities, comprising an act of initializing one or more processors to perform operations of:
    receiving an input signal;
    selecting a class of entities to be recognized;
    recognizing a set of entities of the selected class in the input signal using an Adaptive Resonance Theory (ART)-based neural network;
    selecting a set of threshold criteria by which a set of anomalous entities can be detected within the set of recognized entities;
    detecting the set of anomalous entities by comparing the set of recognized entities against the set of threshold criteria;
    alerting an operator to the presence of the set of anomalous entities, whereby anomalous entities are detected;
    prompting the operator to assign new labels to the set of anomalous entities;
    discovering underlying hierarchical relationships between the new labels assigned by the operator; and
    updating a knowledge database with the new labels and hierarchical relationships,
    whereby anomalous entities are classified and hierarchically related.

2. The method of claim 1, where in the operation of receiving an input signal, the input signal is a signal selected from the group consisting of a video signal, an audio signal, a radar signal, and a sonar signal.

3. The method of claim 2, where in the operation of recognizing a set of entities, the entities recognized are selected from the group consisting of objects, spatial patterns, events and behaviors.

4. The method of claim 1, where in the operation of receiving an input signal, the input signal is a signal selected from the group consisting of a video signal, an audio signal, a radar signal, and a sonar signal.

5. The method of claim 1, where in the operation of recognizing a set of entities, the entities recognized are selected from the group consisting of objects, spatial patterns, events and behaviors.

6. The method of claim 1, wherein in recognizing the set of entities, the one or more processors further perform operations of:
    using a Scene Recognition Engine (SCE) to recognize spatial relationships between objects that compose a particular scene category in static imagery as captured from the input signal, where the input signal is a video signal; and
    using an Event Recognition Engine (ERE) to recognize spatio-temporal sequences and, thereby, recognize events and behaviors in the video signal by maintaining and recognizing ordered spatio-temporal sequences.

7. An actionable-intelligence system for detecting anomalous entities, comprising one or more processors configured to perform operations of:
    receiving an input signal;
    selecting a class of entities to be recognized;
    recognizing a set of entities of the selected class in the input signal using an Adaptive Resonance Theory (ART)-based neural network;
    selecting a set of threshold criteria by which a set of anomalous entities can be detected within the set of recognized entities;
    detecting the set of anomalous entities by comparing the set of recognized entities against the set of threshold criteria;
    alerting an operator to the presence of the set of anomalous entities, whereby anomalous entities are detected;
    prompting the operator to assign new labels to the set of anomalous entities;
    discovering underlying hierarchical relationships between the new labels assigned by the operator; and
    updating a knowledge database with the new labels and hierarchical relationships,
    whereby anomalous entities are classified and hierarchically related.

8. The system of claim 7, where the input signal is a signal selected from the group consisting of a video signal, an audio signal, a radar signal, and a sonar signal.

9. The system of claim 8, where the set of entities recognized are selected from the group consisting of objects, spatial patterns, events and behaviors.

10. The system of claim 7, where the input signal is a signal selected from the group consisting of a video signal, an audio signal, a radar signal, and a sonar signal.

11. The system of claim 7, where the set of entities recognized is selected from the group consisting of objects, spatial patterns, events and behaviors.

12. The system of claim 7, further configured to perform operations of:
  using a Scene Recognition Engine (SCE) to recognize spatial relationships between objects that compose a particular scene category in static imagery as captured from the input signal, where the input signal is a video signal; and
  using an Event Recognition Engine (ERE) to recognize spatio-temporal sequences and, thereby, recognize events and behaviors in the video signal by maintaining and recognizing ordered spatio-temporal sequences.

13. An actionable intelligence computer program product for detecting anomalous entities, the computer program product comprising computer-readable instruction means stored on a non-transitory computer-readable medium that are executable by a computer having a processor for causing the processor to perform operations of:
  receiving an input signal;
  selecting a class of entities to be recognized;
  recognizing a set of entities of the selected class in the input signal using an Adaptive Resonance Theory (ART)-based neural network;
  selecting a set of threshold criteria by which a set of anomalous entities can be detected within the set of recognized entities;
  detecting the set of anomalous entities by comparing the set of recognized entities against the set of threshold criteria;
  alerting an operator to the presence of the set of anomalous entities, whereby anomalous entities are detected;
  prompting the operator to assign new labels to the set of anomalous entities;
  discovering underlying hierarchical relationships between the new labels assigned by the operator; and
  updating a knowledge database with the new labels and hierarchical relationships,
  whereby anomalous entities are classified and hierarchically related.

14. The computer program product of claim 13, where the input signal is a signal selected from the group consisting of a video signal, an audio signal, a radar signal, and a sonar signal.

15. The computer program product of claim 14, where the set of entities recognized are selected from the group consisting of objects, spatial patterns, events and behaviors.

16. The computer program product of claim 13, where the input signal is a signal selected from the group consisting of a video signal, an audio signal, a radar signal, and a sonar signal.

17. The computer program product of claim 13, where the set of entities recognized is selected from the group consisting of objects, spatial patterns, events and behaviors.

18. The computer program product of claim 13, further comprising computer-readable instructions to cause one or more processors to perform operations of:
  using a Scene Recognition Engine (SCE) to recognize spatial relationships between objects that compose a particular scene category in static imagery as captured from the input signal, where the input signal is a video signal; and
  using an Event Recognition Engine (ERE) to recognize spatio-temporal sequences and, thereby, recognize events and behaviors in the video signal by maintaining and recognizing ordered spatio-temporal sequences.

* * * * *